United States Patent [19]

Imataki et al.

[11] Patent Number: 5,744,792
[45] Date of Patent: Apr. 28, 1998

[54] HYBRID INFORMATION RECORDING MEDIUM

[75] Inventors: Hiroyuki Imataki, Yokohama; Mizuho Hiraoka, Kawasaki, both of Japan

[73] Assignee: Canon Kabushiki Kaisha, Tokyo, Japan

[21] Appl. No.: 736,965

[22] Filed: Oct. 25, 1996

Related U.S. Application Data

[63] Continuation of Ser. No. 313,583, Sep. 29, 1994, abandoned.

[30] Foreign Application Priority Data

Oct. 5, 1993 [JP] Japan ............... 5-271138

[51] Int. Cl.⁶ .................. G06K 19/06; G06K 19/00
[52] U.S. Cl. .................................. 235/492; 235/487
[58] Field of Search ................... 235/441, 440, 235/492, 487, 486; 363/250

[56] References Cited

U.S. PATENT DOCUMENTS

| | | | |
|---|---|---|---|
| 4,617,216 | 10/1986 | Haghiri-Tehrani et al. | 235/488 |
| 4,672,182 | 6/1987 | Hirokawa | 235/436 |
| 4,719,140 | 1/1988 | Hara et al. | 235/488 X |
| 4,879,153 | 11/1989 | Ohashi et al. | 235/488 X |
| 4,916,300 | 4/1990 | Ishida | 235/488 X |
| 4,990,759 | 2/1991 | Gloton et al. | 235/488 X |
| 5,085,925 | 2/1992 | Hiraoka et al. | 428/215 |
| 5,111,033 | 5/1992 | Fujita | 235/488 |
| 5,208,450 | 5/1993 | Uenishi et al. | 235/488 X |
| 5,248,584 | 9/1993 | Miura et al. | 430/270 |
| 5,272,326 | 12/1993 | Fujita | 235/488 X |
| 5,317,138 | 5/1994 | Togawa | 235/441 X |
| 5,332,890 | 7/1994 | Kitahara | 235/441 X |

FOREIGN PATENT DOCUMENTS

| | | | |
|---|---|---|---|
| 0147337 | 7/1985 | European Pat. Off. | |
| 0212505 | 3/1987 | European Pat. Off. | 235/487 |
| 0431493 | 6/1991 | European Pat. Off. | 235/375 |
| 0528275 | 2/1993 | European Pat. Off. | 235/487 |
| 2575854 | 7/1986 | France | 235/492 |
| 61-103287 | 5/1986 | Japan | 235/487 |
| 62-103197 | 5/1987 | Japan | 235/492 |
| 4-49098 | 2/1992 | Japan | 235/487 |
| 5067250 | 3/1993 | Japan | 235/440 |
| 2100669 | 1/1983 | United Kingdom | 235/487 |

*Primary Examiner*—Donald T. Hajec
*Assistant Examiner*—Thien Minh Le
*Attorney, Agent, or Firm*—Fitzpatrick, Cella, Harper & Scinto

[57] ABSTRACT

A hybrid information recording medium provided with an IC module and an optical recording layer as information storage means, which can avoid the influence of heat generated at the IC module on the optical recording layer. The hybrid information recording medium comprises a first substrate which retains the IC module. The first substrate does not contact the optical recording layer.

46 Claims, 8 Drawing Sheets

HYBRID INFORMATION RECORDING MEDIUM

This application is a continuation of application Ser. No. 08/313,583 filed Sep. 29, 1994, now abandoned.

BACKGROUND OF THE INVENTION

1. Field of the Invention

This invention relates to a hybrid information recording medium provided with a plurality of information storage means.

2. Related Background Art

Hitherto, as information recording media, there have been known a magnetic recording medium capable of recording and/or reproducing information magnetically, an optical recording medium capable of recording and/or reproducing information with a light beam, and an information recording medium capable of recording and/or reproducing information electrically, for example an IC card which is an information card provided with an integrated circuit module.

In recent years, however, a hybrid information recording medium having a plurality of information storage means has been proposed.

Hybrid information cards having an optical recording layer and an IC module are disclosed, for example, in Japanese Laid-Open Patent Applications JP-A-61-103287 and JP-A-4-49098.

Such a hybrid information recording medium is disclosed in JP-A-61-103287, a typical sectional view of such a medium being shown in FIG. 1.

Referring to FIG. 1, 101 is an information card, 102 is a card substrate, 103 is an optical recording medium, and 104 is an IC module. However, there is no disclosure in JP-A-61-103287 about any particular composition which improves the hybrid information medium's characteristics, or a method of producing such a hybrid information recording medium.

SUMMARY OF THE INVENTION

In view of the above prior art, an object of the present invention is to provide a high quality hybrid information recording medium.

Another object of the present invention is to provide a process for producing a high quality hybrid information recording medium at lower cost than has previously been possible.

According to an aspect of the present invention, there is provided a hybrid information recording medium provided with an IC module and an optical recording layer as information storage means, wherein the substrate which retains the IC module does not contact the optical recording layer directly.

According to another aspect of the present invention, there is provided a process for producing a hybrid information recording medium provided with an IC module and an optical recording layer as information storage means, which comprises the steps of:

provided a first substrate for retaining the IC module;

providing a second substrate provided with the optical recording layer;

bonding the first substrate to the second substrate without exposing the optical recording layer, and without bringing into contact the optical recording layer with the first substrate; and bonding the IC module to the first substrate.

Thus according to the present invention, there is provided a high quality hybrid information recording medium which can avoid the influence of the operation of the IC module on the optical recording layer by avoiding the direct contact of the first substrate with the second substrate.

These and other objects, features and advantages of the present invention will become more apparent upon a consideration of the following description of a number of embodiments of the present invention which will be described by way of example only with reference to the accompanying drawings.

DESCRIPTION OF THE PREFERRED EMBODIMENTS

Figure 1:
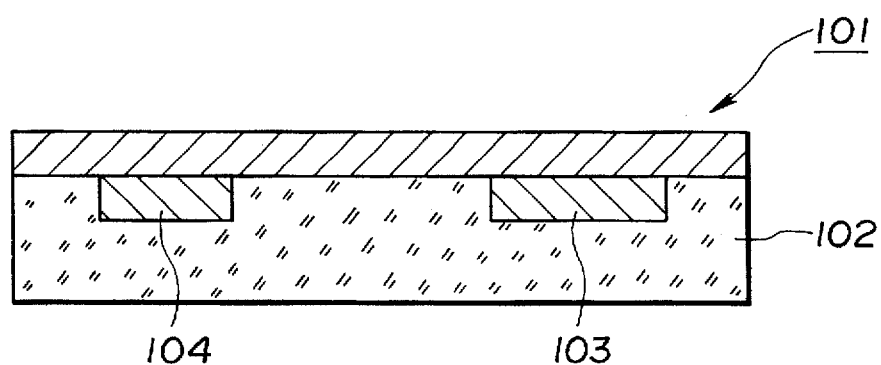
FIG. 1 is a schematic view of a hybrid information card according to the prior art.

Referring to FIG. 2(a), 201 is an hybrid information card, 202 is an optical recording area capable of recording information with light or provided with information in the form of optically detectable mark, and 203 is an area provided with an IC module.

Referring to FIG. 2(b), 204 is an IC module, 205 is optical recording layer provided at the area 202, 206 is a first substrate which retains the IC module 204, 207 is a second substrate provided with the optical recording layer 205, and 209 is an adhesive layer for bonding the IC module 204 to the first substrate 206.

In accordance with the present invention, the first substrate 206 may be bonded to the second substrate 207 without exposing the optical recording layer 205, and without bringing into contact the optical recording layer 205 with the first substrate 206. According to this composition, by avoiding a direct contact between the first substrate 206 and the optical recording layer 205, heat generated by the operation of the IC module 204 is prevented from being transmitted to the optical recording layer 205, as a result of which there is provided a high quality hybrid information card.

In the hybrid information card according to FIGS. 2(a) and (b), the first substrate 206 and the second substrate 207 are bonded without exposing the optical recording layer 205, and avoiding the contact of the optical recording layer with the first substrate 206 by use of the adhesive layer 208.

It will be seen that if the optical recording layer did contact the first substrate, and the optical recording layer contains organic coloring matter, the optical recording layer might deteriorate due to transfer of heat generated by the IC module, because organic colouring matter tends to be deteriorated by heat inherently. Furthermore if the optical recording layer contacts the first substrate, and the power of the light beam used for reproducing information recorded in the optical recording area is increased within the range that the light beam does not deteriorate the optical recording layer so as to upgrade the S/N ratio of the reproduced signals, the optical recording layer might deteriorate due to the combination of heat generated at the recording layer by irradiation of the light beam and that generated at the IC module.

However, in a hybrid informing recording medium according to this invention, such problems described above can be resolved, because influence of heat generated at the IC module on the optical recording layer is effectively avoided. A medium in accordance with the invention is particularly preferable for the credit card sized hybrid information recording media. As the size of the credit cards has been standardized as 85.6 mm long and 54 mm wide and 0.68–0.8 mm thickness, for a credit card sized hybrid card provided with an IC module and an optical recording layer, the two information storage means cannot avoid being close to each other, so that a problem of heat generated at the IC module is quite serious for the optical recording medium.

However, in a medium in accordance with an embodiment of the present invention, even if the hybrid information recording medium has a credit card size, the problem can be effectively resolved.

Referring to the embodiment shown in FIGS. 2(a) and 2(b), it may be preferable to provide a gap 210 between the IC module 204 and the second substrate 207, and between the IC module 204 and the adhesive layer 208, so as to avoid a heat transfer from the IC module 204 to the optical recording layer more effectively, and avoid damage of the IC module when the card 201 is bent.

The gap 210 may preferably have a width of (0.03)~(1 mm), further preferably (0.1)~(0.5 mm).

A process for producing the hybrid information card described in FIGS. 2(a) and 2(b) will now be explained with reference to FIGS. 3(a), 3(b), and 3(c).

Firstly, the substrate constituting the first substrate 206 is bonded to the second substrate 207 which is provided with the optical recording layer 205, by the adhesive layer 208 so as to form an optical card having a laminated structure as shown in FIG. 3(a).

Next a concavity 301 is provided in the optical card as shown in FIG. 3(b). The IC module 204 is then bonded to the substrate 206 at the bottom of the concavity 301 by means of an adhesive layer 209 so as to produce the hybrid information card 201 shown in FIGS. 2(b) and 3(c).

FIGS. 4(a) and 4(b) illustrate a second embodiment of a process for producing a hybrid information card in accordance with an embodiment of the present invention.

Referring to FIG. 4(a), 407 is a second substrate provided with the optical recording layer. The substrate 407 is provided with a hole 401 in which may be embedded the IC module 204. 406 is a first substrate which retains the IC module 204. The substrate 406 is also provided with a concavity 402 for the IC module 204.

The hybrid information card according to this embodiment can be produced by bonding the substrates 406 and 407 to each other by a suitable bonding method. For example, an adhesive layer 408 may be used. The IC module 204 is fitted to the substrate 406 at the bottom of a concavity 403 (illustrated in FIG. 4(b)) as shown in FIGS. 2(b) and 3(c).

In this second embodiment, the IC module 204 may be fitted before the substrates 406 and 407 are bonded to each other.

The second embodiment of a process in accordance with the invention is preferable to the first embodiment, because in the second embodiment it is not necessary to include the step of providing a concavity 301 on the laminated optical card. Thus any peel between the interface between the first substrate and the adhesive layer, and/or the interface between the second substrate and the adhesive layer is avoided. Furthermore, the size of the concavity can be maintained equal between each hybrid information recording medium.

Referring again to FIGS. 2(a) to 4, a medium in which an IC module 204 which has exposed contacts 211 at the side of the substrate 207 is described. However it is also possible for the IC module 204 to have a contact 211 which is exposed at the side of the substrate 206 as illustrated in FIG. 5. The required configuration can be decided according to the relative positions of an optical recording and/or reproducing means (not shown) and a means for recording and/or reproducing of information in the IC module (also not shown) in an information recording and/or reproducing apparatus for the hybrid information recording medium.

Referring to FIGS. 2(a) to 5, it can be seen that the hybrid medium has a configuration in which the IC module has a thickness larger than a sum of the thicknesses of the substrate 207 and the thickness of the adhesive layer 208, or a configuration in which the IC module has a thickness which is larger than the sum of the thicknesses of the substrate 206 and the adhesive layer 208.

However, a medium and method in accordance with the invention is applicable even though the thickness of IC module thickness is smaller than the sum of the thicknesses of the substrate 207 and the adhesive layer 208, or the thickness of the IC module is smaller than the sum of a thicknesses of the substrate 206 and the adhesive layer 208.

Figure 6A:
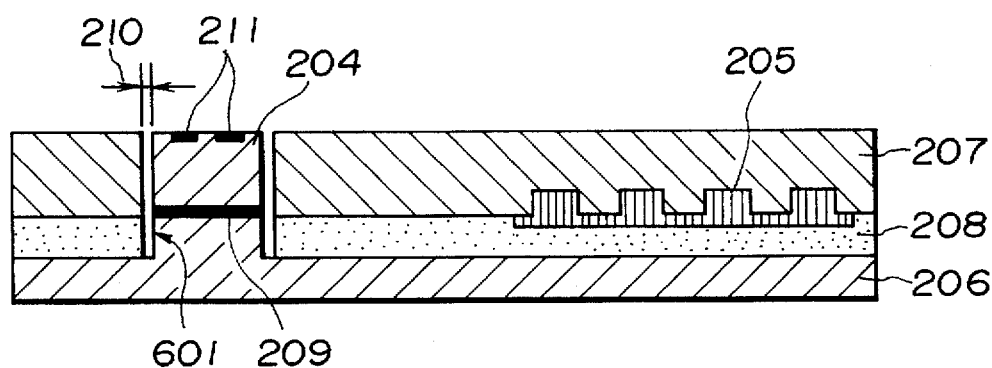
FIG. 6(a) shows schematically a third embodiment of the hybrid information card in accordance with the invention having an IC module whose thickness is smaller than the thickness of the second substrate.
Figure 6B:
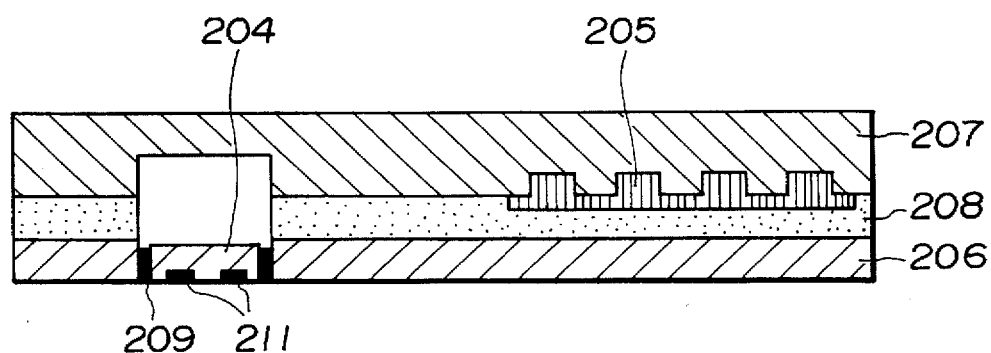
FIG. 6(b) shows schematically a fourth embodiment of the hybrid information card having an IC module whose thickness is smaller than a thickness of the first substrate.

FIGS. 6(a) and 6(b) are schematic views for illustrating a hybrid information card having an IC module that thickness is smaller than the thickness of the substrate 206 or substrate 207 according to the present invention.

Referring to FIG. 6(a), the IC module 204 is fitted on the protrusion part 601 provided at the area 203 of the substrate 206. It may be preferable to make a gap 210 between the IC module 204 and substrate so as to avoid heat transfer from the IC module to the optical recording layer.

Referring to FIG. 6(b), the IC module 204 is embedded in a concavity 602 provided at the area 203 of the substrate 206.

Figure 7:
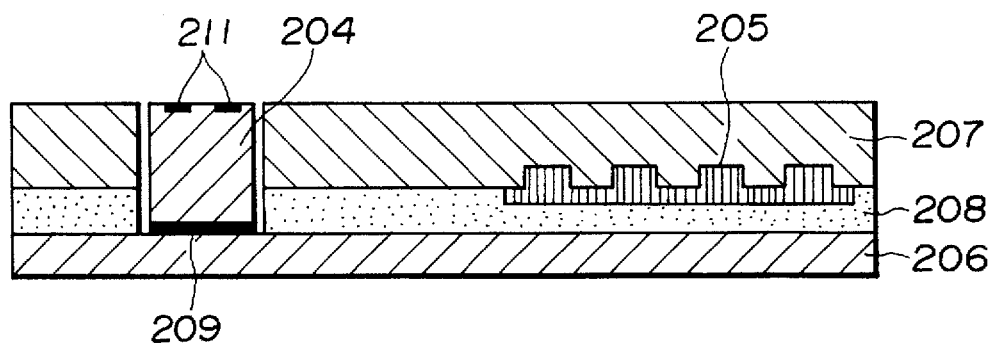
FIG. 7 is a schematic sectional view of a fifth embodiment of a hybrid information card according to the present invention.

FIG. 7 illustrates a hybrid information card having an IC module whose thickness is the same as the total thickness of the substrate 207 and the adhesive layer 208.

In FIGS. 2(a) to 7, an adhesive layer 208 is used for bonding the IC module 204 and the substrate 206 is used.

Referring to the embodiments shown in FIGS. 2(a) to 7, where an adhesive layer 209 is used for bonding the IC module 204 and the substrate 206, it may be preferable to avoid the contact of the adhesive layer 209 and the adhesive layer 208.

Next, another embodiment of the hybrid information recording medium according to the present invention will be explained with reference to FIG. 8.

Figure 8:
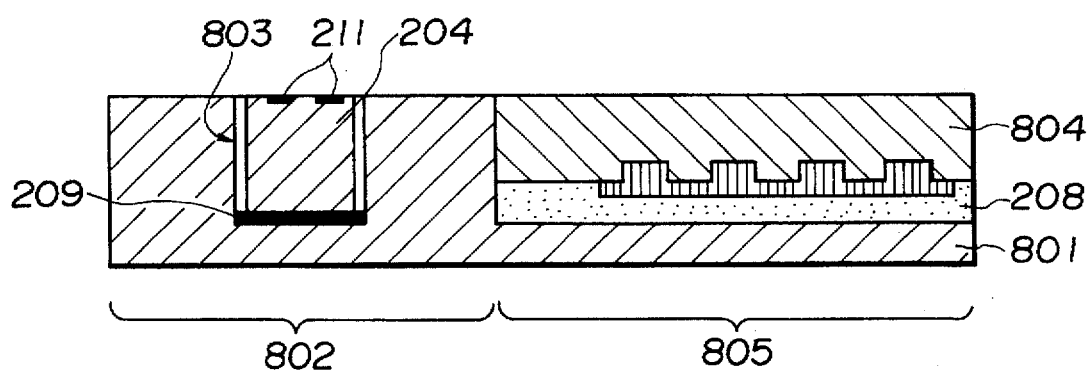
FIG. 8 is a schematic sectional view of a sixth embodiment of a hybrid information card according to the present invention.

Referring now to FIG. 8, 801 is a substrate for retaining the IC module 204. The substrate 801 has an area 802 designed to receive the IC module and a second area 805 designed to receive the second substrate 804. The substrate 801 is provided with a concavity 803 at the IC module fitting part 802. The depth of the concavity 803 is the same thickness as the IC module 204 so that the substrate 801 has a thickness greater than the thickness of the IC module 204 at the part 802 and a thinner thickness at the part 805 where the second substrate 804 provided with an optical recording layer 205 is bonded.

This hybrid information recording medium configuration is advantageous because it can adapt to a change of thickness of the IC modules by changing the depth of the concavity 803 in the substrate 801.

Furthermore, no special treatment is necessary to attach the IC module to the second substrate 804, so that the hybrid information card can be produced at lower cost.

Figure 9:
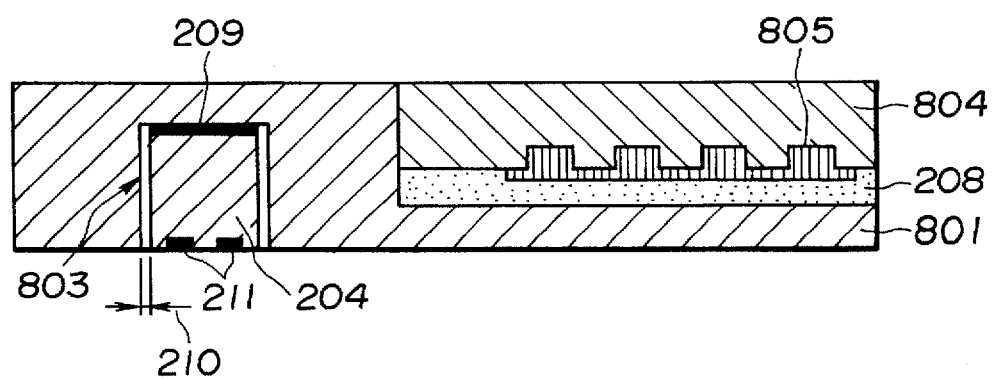
FIG. 9 is a schematic sectional view of a seventh embodiment of a hybrid information card according to the present invention.

As can be seen in FIG. 8, the concavity 803 is provided at the substrate 801 such that the contacts 211 of the IC module 204 are exposed at the side of the first substrate 804. However, the concavity 803 may be provided so as to expose the contacts 211 at the side of the first substrate 801 as shown in FIG. 9.

Figure 10:
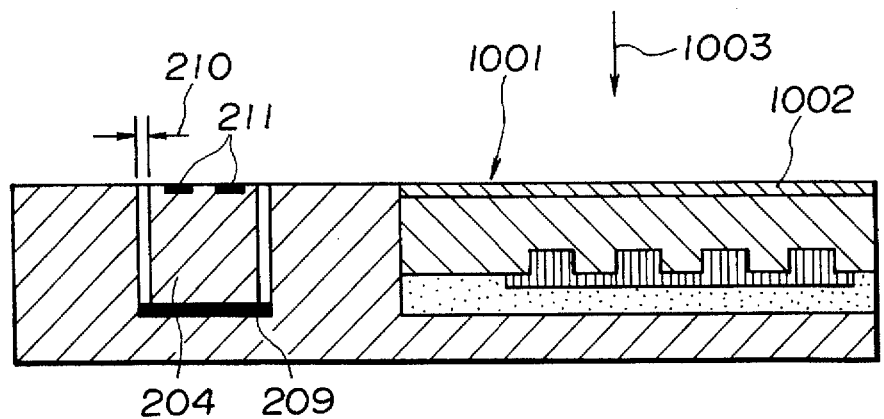
FIG. 10 is a schematic view of an eighth embodiment of a hybrid information card according to the present invention provided with a hard coat layer.

Referring now to FIG. 10 in these embodiments of a hybrid information recording medium according to the present invention, a hard coat layer 1002 is formed on either the exposed surface of the first substrate or the exposed surface of the second substrate so as to prevent the surface 1001 from which is irradiated by a recording and/or reproducing light beam 1003 from being scratched.

Where the contacts 211 of the IC module 204 are exposed at the surface 1001, the hard coat layer 1002 is preferably provided only over the part 805 of the first substrate 801 or only over the second substrate 804. In such a situation the configuration shown in FIG. 8 is preferable as the provision of the hard coat layer 1002 can be performed without considering the IC module 204.

Figure 11:
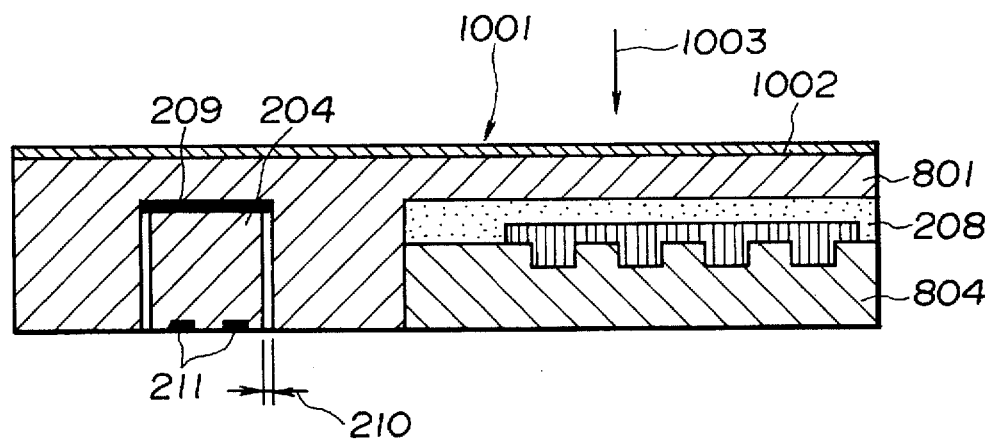
FIG. 11 is a schematic view of a ninth embodiment of a hybrid information card according to the present invention provided with a hard coat layer.

Referring now to FIG. 11, where, however the contacts 211 are exposed on the surface opposite to the side with the surface 1001, the hard coat layer 1002 may either cover the area 805, or else may cover the whole surface of the substrate 801.

Figure 12:
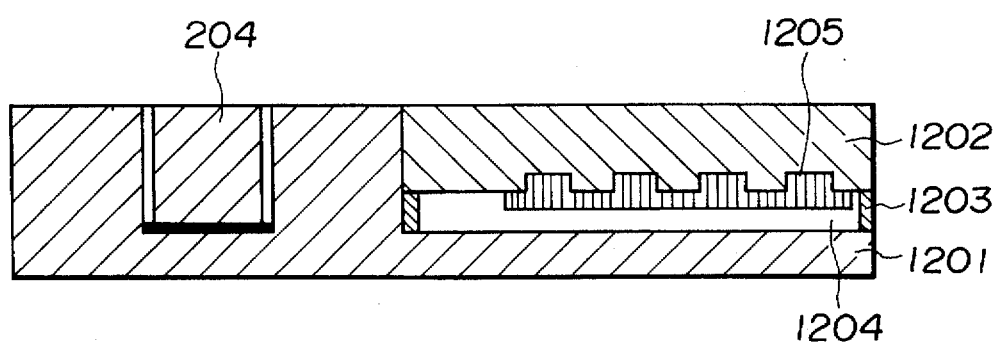
FIG. 12 is a schematic view of a tenth embodiment of a hybrid information card according to the present invention.

Referring to FIG. 12, 1201 is the first substrate which retains the IC module 204, whilst 1202 is the second substrate which retains the optical recording layer 1205. The second substrate 1202 is bonded to the first substrate 1201 with the optical recording layer 1205 facing the first substrate 1201 via a spacer 1203. In this configuration, direct contact of the first substrate 1201 and the optical recording layer 1205 is avoided by providing an air gap 1204 between the first substrate 1201 and the optical recording layer 1205.

In the embodiments of a hybrid information recording medium according to the present invention, the first substrate which retains an IC module, and the second substrate which retains an optical recording layer are not limited to specific material as long as the substrates have the requisite strengths for a hybrid information recording medium according to the present invention. The substrate which transmits the recording and/or reproducing light beam may be a transparent and low optical strain substrate.

Examples of materials for the substrates include acrylic resin, polycarbonate resin, amorphous polyolefin, epoxy resin, polystyrene, polyester resin, polydiethylene glycol bis-allyl carbonate (CR39 a trade name of a producr producted by Tokuyama Soda), polyallyldiglycol carbonate (RAV 7® a trade name of a product producted by Mitsui Petrochemical) and polymethyl pentene (TPX).

As an optical recording layer, there may be used a layer on which can be recorded information as an optically detectable mark when irradiated with a recording light beam. For example, the recording light beam may produce deformation of the layer, a change of the optical characteristics of the optical recording layer such as decolorization or phase change. Alternatively or additionally there may be included a layer which can be a reflective layer, for reproducing an optically detectable preformat on the second substrate.

The recording layer may include known optical recording materials, for example, low-melting point metals such as Te, Bi, Sn, Sb, In etc., alloys of these metals, inorganic thin layers in which phase changes occur such as Te-type alloy, organic coloring matter such as cyanin type, squarilium type, phthalocynaine type, tetradehydrocholine type, polymethine type, naphthoquinone type, organic metal complexes such as benzene dithiol nickel complex, and amorphous magnetic recording materials containing rare earth and transition metal elements to be used as magnetooptic recording materials such as TbFeCo, GdFeCo etc.

For the adhesive that constitutes the adhesive layer 208, a vast range of materials can be used provided that the adhesive does not cause optical recording layer 205 to deteriorate. For example, it is possible to use a polymer and/or copolymer of a vinyl monomer such as a vinyl acetate, a vinyl chloride, an ethylene, an acrylic acid, an acrylic ester and acrylic amid etc., and thermoplastic type adhesive such as polyamide, polyester and polyether, and thermosetting adhesive such as a resin having an amido group like a urea resin and a melamine resin, phenol resin, epoxy resin, urethane resin, thermosetting type vinyl resin, and a rubber type adhesive such as material rubber, nitrile rubber, chloroprene rubber, silicone rubber.

With regard to IC module 204, this may comprise an IC module having a microprocessor and/or data memory on a printed circuit board.

Where a preformat is included this takes the form of information recorded in the hybrid information recording medium previously in the form of optically detectable mark. In particular, the preformat may include, for example, 1–4 µm width, 1–20 µm pitch, and 200–5000 Å depth or 200–5000 Å height, tracking grooves which may be formed spirally, concentrically or as stripes, for an optical disk or an optical card, and/or prepit sized of 0.6–10 μm width, 0.6–20 μm length, and 200–5000 Å height or 200–5000 Å depth.

following formula (1) and aminium salt compound shown in the following formula (2) in the ratio of:

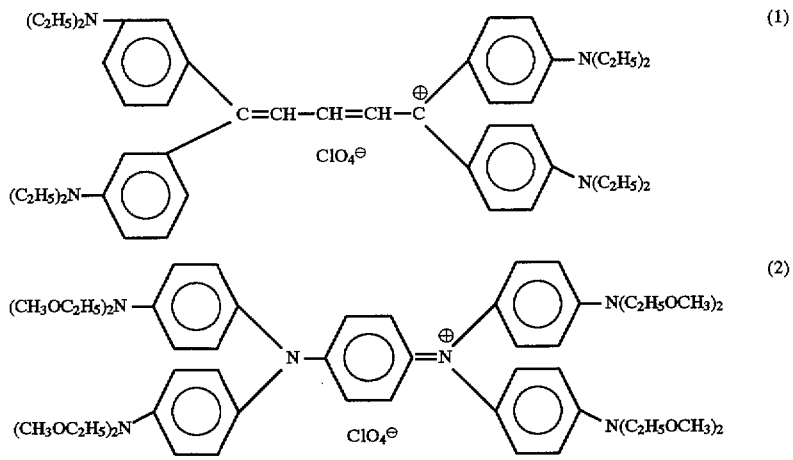

In a medium in accordance with an embodiment of the present invention, it is possible to control transfer of heat generated by the IC module's operation to the optical recording layer effectively by avoiding direct contact of the substrate which retains the IC module and the optical recording layer. As a result, there is provided a high quality hybrid information recording medium in which possible deterioration of the optical recording layer when the IC module is operated can be controlled.

Further, according to the present invention, by separating the substrate for retaining the IC module from the substrate for retaining the optical recording layer, the hybrid information recording medium can be produced efficiently because each production step can be separated. As a result the present invention provides a process for producing a high quality hybrid information recording medium which is low in cost.

A number of embodiments of hybrid information recording media in accordance with the invention, together with their methods of production will now be described in more detail with reference to the following examples.

EXAMPLE 1

The hybrid information card shown in FIG. 9 was prepared by the following steps. The first substrate (804) had dimensions 54 mm width, 85.6 m length, 0.76 mm thickness at the part 802, and 0.3 mm thickness at the part 805 and was formed from polycarbonate. The second substrate 801 was provided with a concavity 803 in which was embedded an IC module 204 sized 12 mm in width, 14 mm in length, and 0.65 mm in depth.

The concavity 803 was provided at the position regulated by the ISO standard. The part 805 of the first substrate had 20 mm width, and 85.6 mm length.

The second substrate 804 had dimensions of 20 mm width, 85.6 mm length and 0.4 mm thickness and formed from polycarbonate substrate was prepared. The second substrate 804 was provided with tracking grooves running parallel to each other and having 3 micron width, 3000 Å depth and 9 micron pitch acting as a preformat on the surface. An optical recording layer (805) was coated by using a wet-coating method, and the optical recording layer was included polymethine coloring matter shown in the Next, the second substrate provided with the optical recording layer was bonded to the first substrate to face the optical recording layer toward the first substrate by using a hot melt type adhesive agent containing ethylene-vinyl acetate copolymer.

An IC module 204 was fitted to the concavity 803 and bonded to the first substrate at the bottom of the concavity 803 using an adhesive (urethane system) layer 209. The gap 210 between the IC module 204 and the first substrate was 0.1 mm.

The second substrate 804 was provided with thermoelectric couples just under the optical recording layer at nine desired positions so as to measure a temperature around the optical recording layer.

Next, this hybrid information card was set in an apparatus for recording and/or reproducing the hybrid card (not shown), and the IC module was operated for 100 hours continuously while a temperature around the optical recording layer was being measured.

As a result, the temperature was not over 35° C. at each temperature measured position, and a difference of the temperature among the measured positions was less than 8° C.

COMPARATIVE EXAMPLE 1

Figure 13:
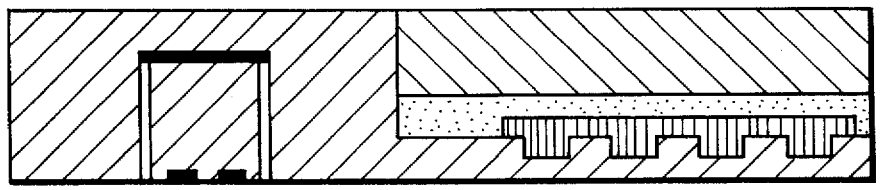
FIG. 13 is a schematic view of a hybrid information card as described in comparative example 1.
Figure 2:
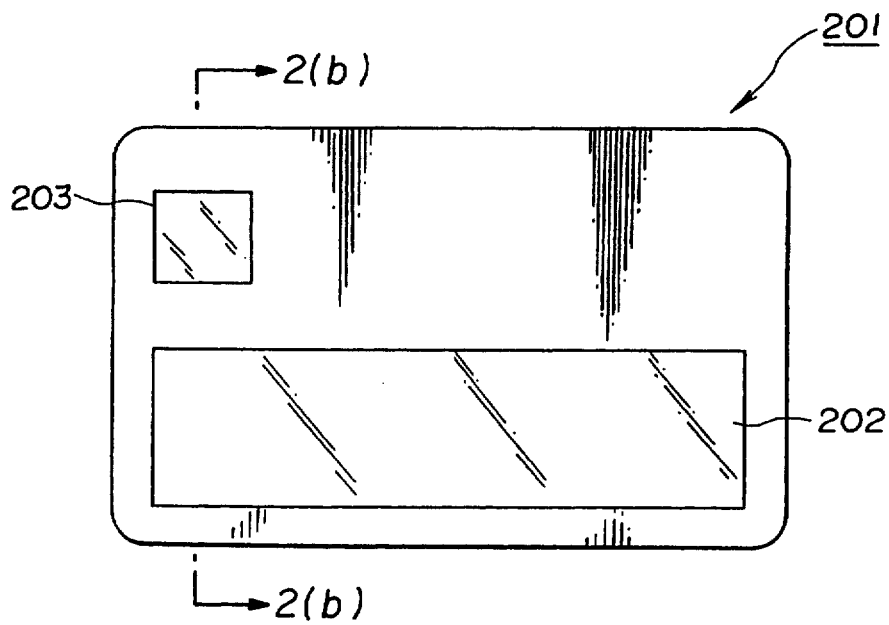
Figure 2:
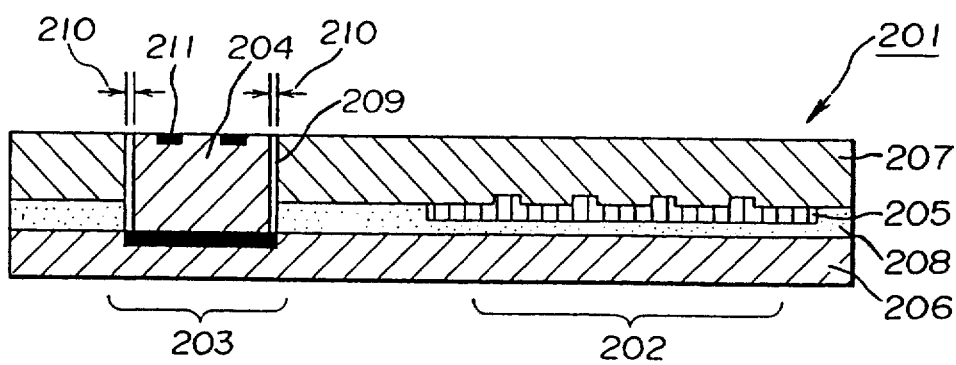
Figure 3:
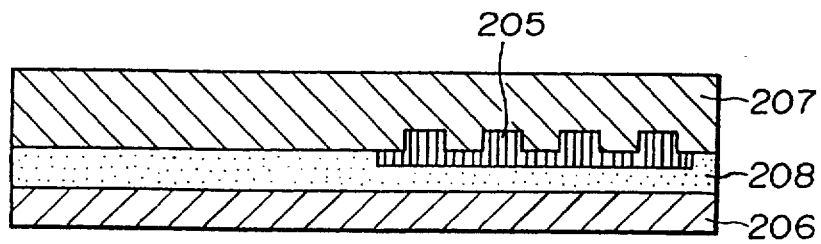
Figure 3:
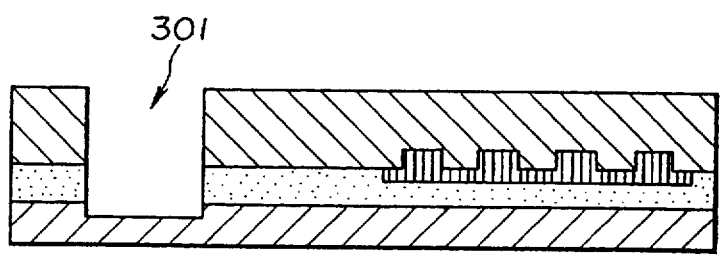
Figure 3:
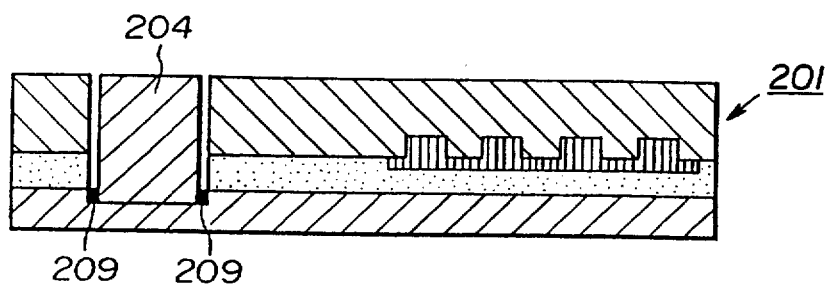
Figure 5:
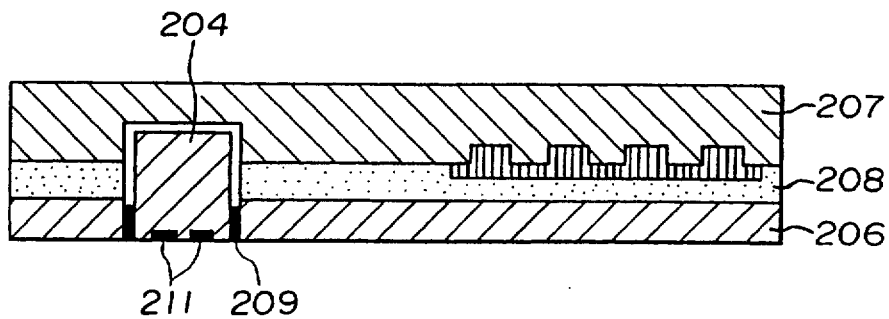
Figure 6:
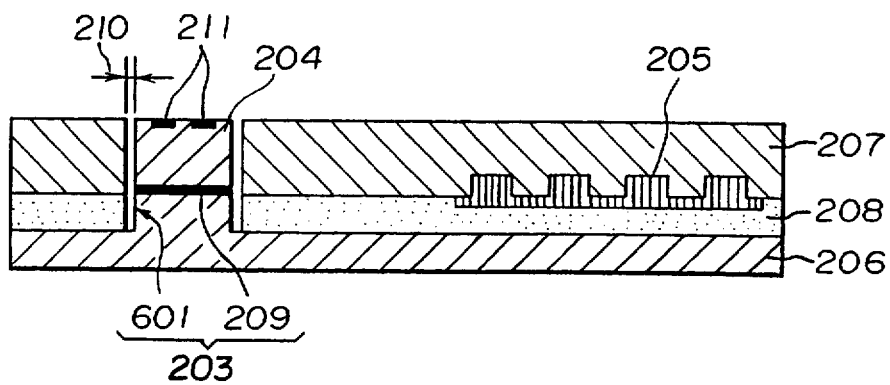
Figure 6:
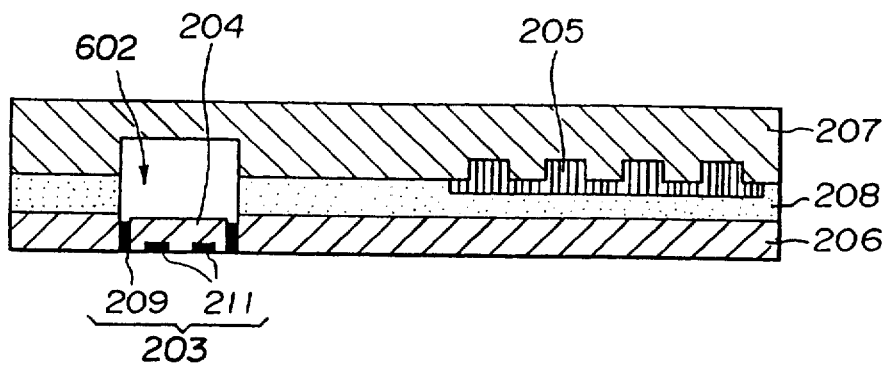
Figure 10:
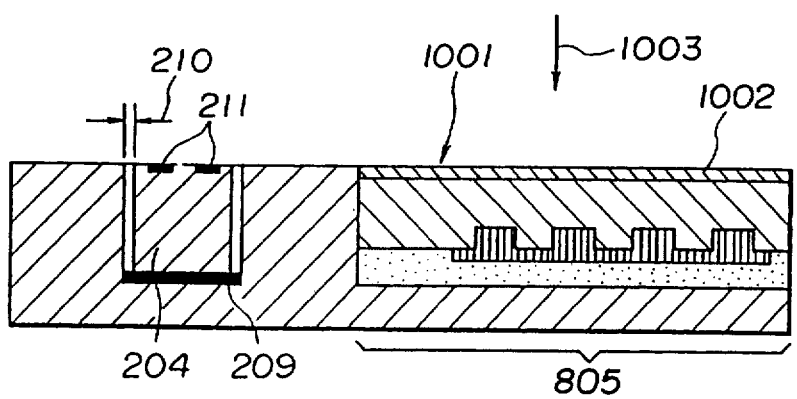
Figure 11:
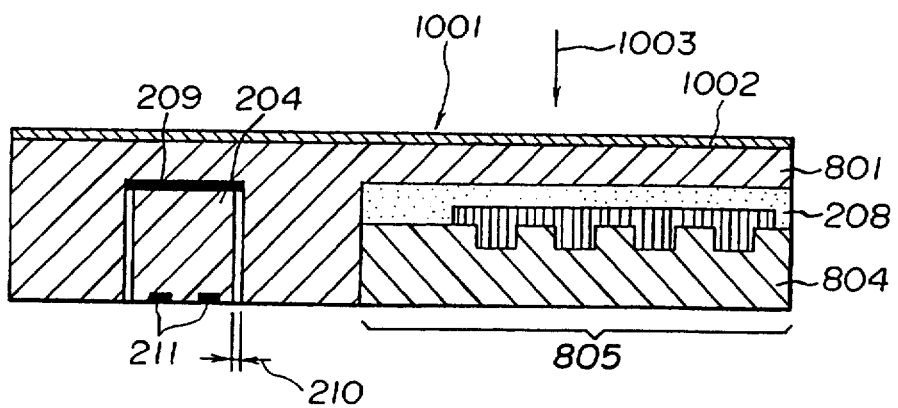

A hybrid information card was prepared in the same manner as in Example 1 except that the configuration of the card was substituted by the configuration shown in FIG. 13, and the information card was evaluated in the same manner as in Example 1. In accordance with this comparative Example 1, the thermoelectric couples (not shown) were provided just under the optical recording layer of the first substrate at nine desired positions.

As a result, there were at some positions measured a temperature of 40° C., and a maximum difference of the temperature among the measurement positions was 10° C. just after operation of the IC module.

EXAMPLE 2

Figure 2:
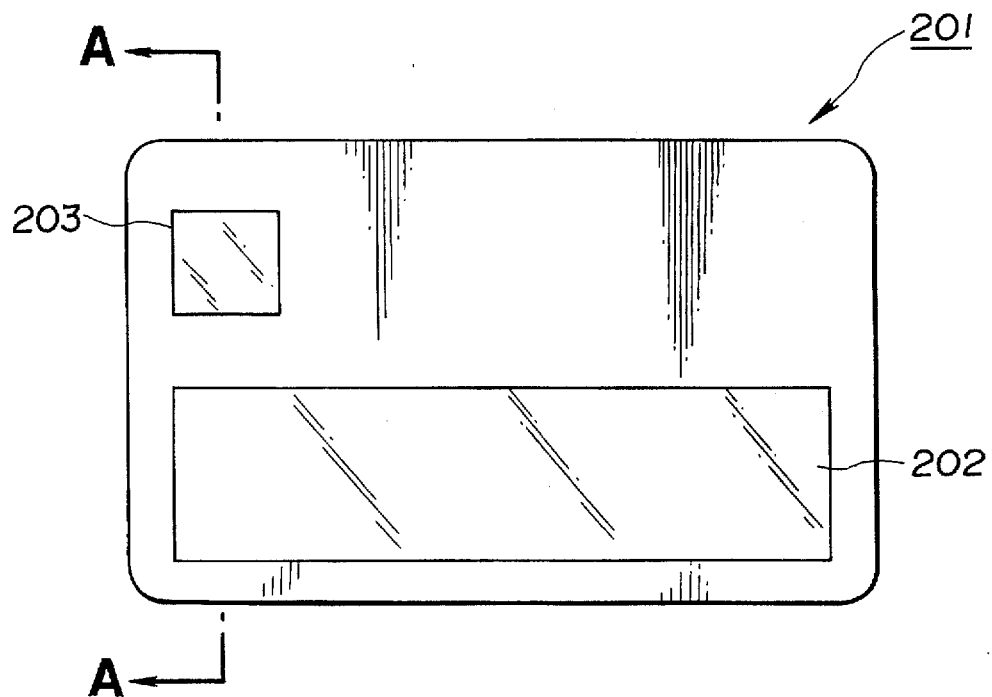
FIG. 2(a) is a schematic plan view of a hybrid information card according to a first embodiment of the present invention.
FIG. 2(b) is a schematic cross section taken on line 2(b)—2(b) of FIG. 2(a)
Figure 2:
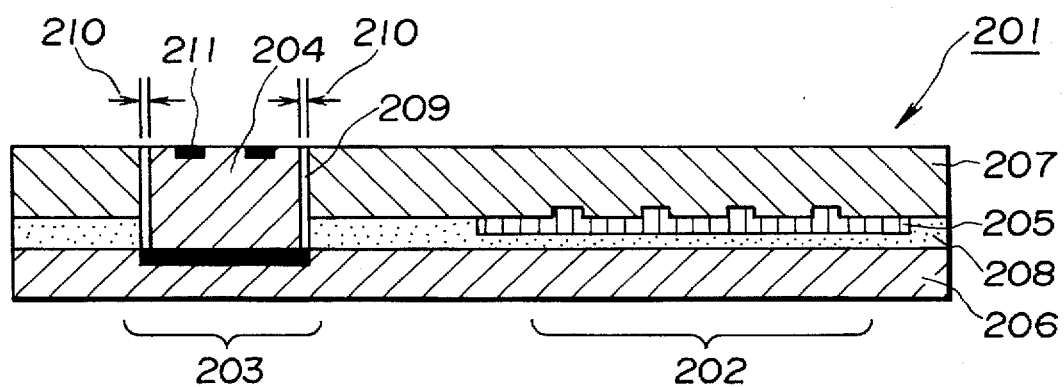
Figure 3:
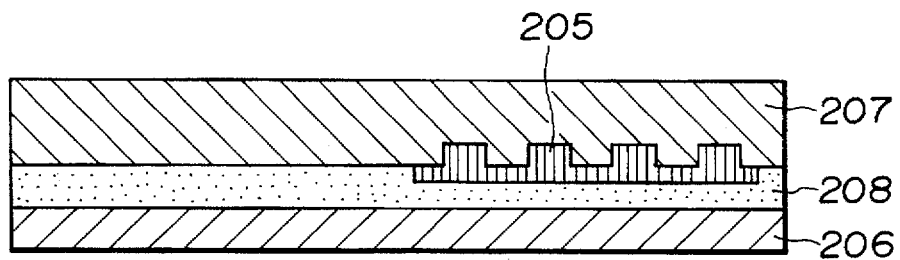
FIGS. 3(a), 3(b) and 3(c) are schematic sectional views for illustrating an embodiment of a process for producing the hybrid information card shown in FIG. 2.
Figure 3:
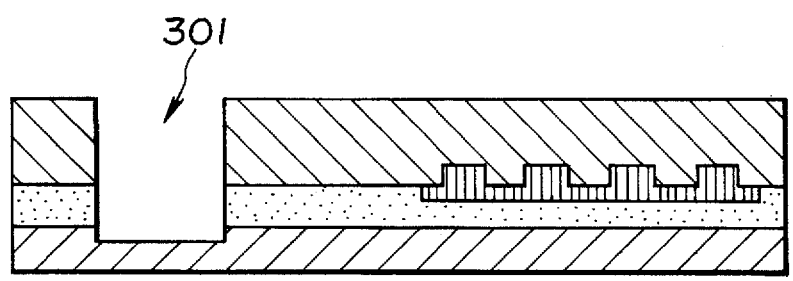
Figure 3:
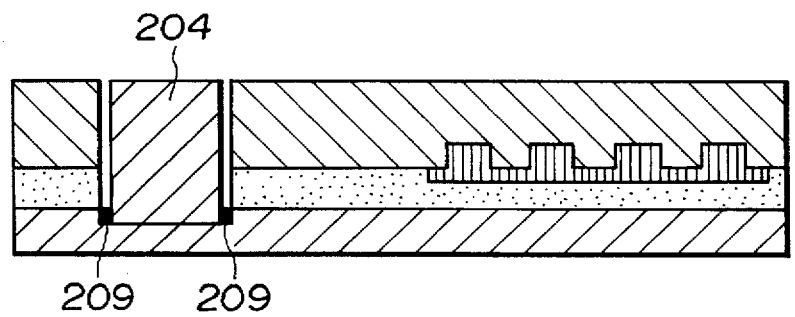
Figure 4:
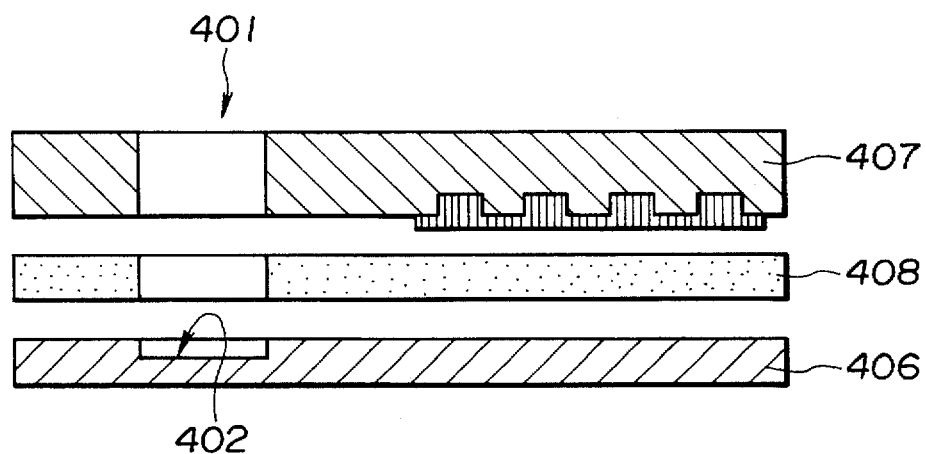
FIGS. 4(a) and 4(b) are schematic sectional views for illustrating another embodiment of a process for producing the hybrid information card shown in FIG. 2.
Figure 4:
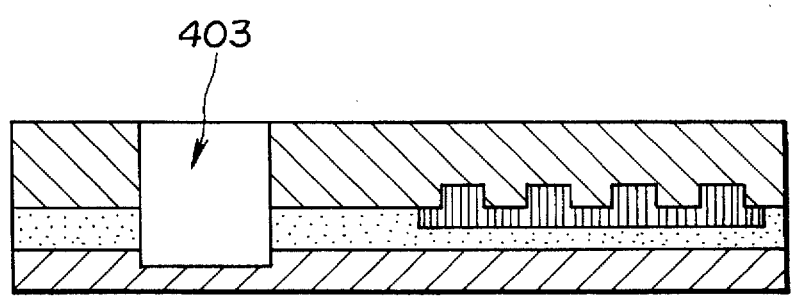
Figure 5:
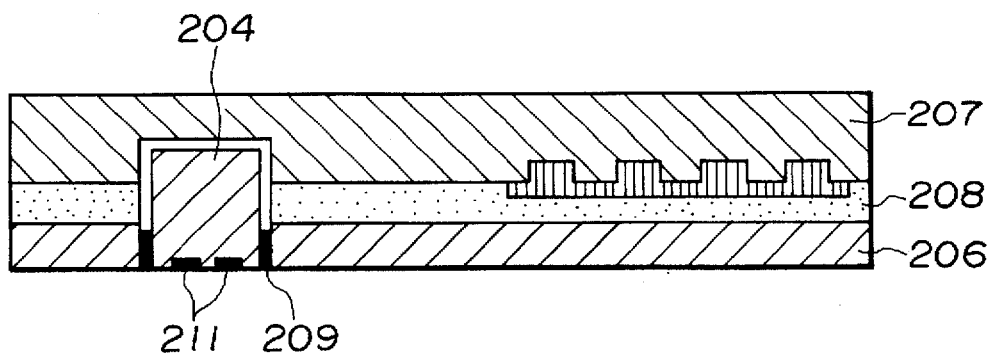
FIG. 5 is a schematic sectional view of a second embodiment of a hybrid information card according to the present invention.

A hybrid information card as shown in FIG. 2 was prepared by using a process as illustrated in FIG. 4.

A 54 mm width, 85.6 mm length and 0.3 mm thick polycarbonate substrate was used as the first substrate. In this was formed a concavity 402 of 13 mm width, 15 mm length and 0.2 mm depth, for embedding the IC module in the area 203.

The concavity 402 was provided at the position regulated by the ISO standard for an IC card.

As a second substrate, 54 mm-width, 85.6 mm-length and 0.4 mm-thick polycarbonate substrate having a 13 mm width and 15 mm length hole 401 at the IC module provided area 203 was prepared. The second substrate was provided with a preformat as for Example 1.

An optical recording layer was coated on the surface of the second substrate in the same manner as in Example 1.

Next, the second substrate provided with the optical recording layer was bonded to the first substrate such that the optical recording layer faced toward the first substrate using a hot melt type adhesive agent containing ethylene-vinyl acetate copolymer to produce an optical card having a laminated structure, and having a concavity 403 for the IC module, as shown in FIG. 4(*b*).

An IC module was fitted to the concavity 403, and bonded to the first substrate at the bottom of the concavity 403 using an adhesive layer (silicone system) to produce a hybrid information card according to the present invention. The gap 210 between the IC module 204 and the second substrate 207 was set to be at 0.2 mm.

The second substrate was provided with thermoelectric couples just under the optical recording layer at nine desired positions so as to measure a temperature around the optical recording layer.

Next, this hybrid information card was evaluated in the same manner as in Example 1.

As a result, the temperature was not over 34° C. at each temperature measured position, and a difference of the temperature among the temperature measured positions was less than 8° C.

What we claim is:

1. A hybrid information recording medium provided with an IC module and an optical recording layer, each as information storage means, said recording medium comprising:
    a first substrate which retains the IC module; and
    a second substrate which retains the optical recording layer,
    wherein the optical recording layer is disposed at a surface of said second substrate which faces said first substrate, and
    wherein the optical recording layer is disposed so as to be out of direct contact with said first substrate to avoid influence of heat from the IC module on the optical recording layer.

2. A hybrid information recording medium according to claim 1, wherein said first substrate indirectly contacts the optical recording layer.

3. A hybrid information recording medium according to claim 1, wherein a gap is provided between said first substrate and the optical recording layer.

4. A hybrid information recording medium according to claim 2, further comprising an adhesive layer, wherein said second substrate retains the optical recording layer, and wherein said first substrate is bonded to said second substrate by said adhesive layer.

5. A hybrid information recording medium according to claim 4, wherein the IC module is thicker than the total thickness of said second substrate and said adhesive layer.

6. A hybrid information recording medium according to claim 5, wherein said first substrate has a concavity for fitting the IC module.

7. A hybrid information recording medium according to claim 6, wherein the IC module is bonded to said first substrate at the bottom of the concavity.

8. A hybrid information recording medium according to claim 5, wherein said second substrate is provided with a hole.

9. A hybrid information recording medium according to claim 4 or 5, wherein at least one contact of the IC module is exposed at a surface of said first substrate.

10. A hybrid information recording medium according to claim 9, wherein the IC module is thicker than the total thickness of said first substrate and said adhesive layer.

11. A hybrid information recording medium according to claim 10, wherein said second substrate has a concavity configured to avoid direct contact between the IC module and said second substrate when the IC module is fitted to said first substrate.

12. A hybrid information recording medium according to claim 10, said first substrate is provided with a hole embedding the IC module.

13. A hybrid information recording medium according to claim 12, wherein the IC module is bonded to said first substrate at a side wall of the hole.

14. A hybrid information recording medium according to claim 4, further comprising an additional adhesive layer wherein the IC module is bonded to said first substrate by said additional adhesive layer.

15. A hybrid information recording medium according to claim 14, wherein said additional adhesive layer which bonds the IC module to said first substrate does not contact said adhesive layer which bonds said second substrate to said first substrate.

16. A hybrid information recording medium according to claim 1, further comprising an adhesive layer wherein the IC module is bonded to said first substrate by said adhesive layer.

17. A hybrid information recording medium according to claim 1, wherein said first substrate has an IC module fitting part and has a second fitting part for said second substrate.

18. A hybrid recording medium according to claim 17, wherein said first substrate has a concavity for fitting the IC module at said IC module fitting part.

19. A hybrid information recording medium according to claim 18, wherein the concavity has a depth configured to allow the IC module to be embedded.

20. A hybrid information recording medium according to claim 19, wherein said first substrate is thicker than the IC module at said IC module fitting part.

21. A hybrid information recording medium according to claim 20, wherein said first substrate has a thickness at said second fitting part which is the same as the thickness of said first substrate at said IC module fitting part when said second substrate is bonded to said first substrate.

22. A hybrid information recording medium according to claim 19, wherein the concavity is configured to allow at least one contact of the IC module to be exposed at a surface of said medium containing said second substrate when the IC module is fitted in the concavity.

23. A hybrid information recording medium according to claim 19, wherein the concavity is configured to allow at least one contact of the IC module to be exposed at a surface of said medium opposite to the surface of said second substrate when the IC module is fitted to the concavity.

24. A hybrid information recording medium according to claim 1, wherein a surface of said second substrate is provided with a preformat.

25. A hybrid information recording medium according to claim 1, wherein the optical recording layer includes organic coloring matter.

26. A hybrid information recording medium according to claim 25, wherein the organic coloring matter includes polymethine type coloring matter.

27. A hybrid information recording medium according to claim 1, wherein the IC module comprises a microprocessor.

28. A hybrid information recording medium according to claim 1, wherein the IC module comprises an IC memory.

29. A process for producing a hybrid information recording medium comprising an IC module and an optical recording layer, each as information storage means, which comprises the steps of:

providing a first substrate for retaining the IC module;

providing a second substrate carrying the optical recording layer, wherein the optical recording layer is disposed at a surface of the second substrate which faces the first substrate;

bonding the first substrate to the second substrate without exposing the optical recording layer, and without bringing into contact the optical recording layer with the first substrate to avoid influence of heat from the IC module on the optical recording layer; and bonding the IC module to the first substrate.

30. A hybrid information recording medium provided with an IC module and an optical recording layer, each as information storage means, the hybrid information recording medium comprising:

a first substrate; and a second substrate, wherein the optical recording layer and an adhesive layer are provided between said first substrate and said second substrate, wherein the optical recording layer is disposed in direct contact with said second substrate and not in direct contact with said first substrate, wherein the IC module is thicker than the total thickness of the adhesive layer and said first substrate, wherein the IC module is embedded in said hybrid information recording medium so that an electrode of the IC module is exposed at an outer surface of said first substrate, and wherein the IC module is fixed to said hybrid information recording medium so as not to contact with said second substrate directly.

31. A hybrid information recording medium according to claim 30, wherein a void is provided around the IC module to prevent the IC module from being in direct contact with said second substrate.

32. A hybrid information recording medium according to claim 4, wherein said adhesive layer is disposed between the optical recording layer retained by said second substrate and said first substrate.

33. A process according to claim 29, wherein said bonding step comprises a step of bonding the first substrate to the second substrate with an adhesive layer, wherein the adhesive layer is disposed between the optical recording layer carried by the second substrate and the first substrate so that the optical recording layer does not contact the first substrate.

34. A hybrid information recording medium according to claim 30, wherein the adhesive layer is provided between the optical recording layer and said first substrate so that the optical recording layer is not in direct contact with said first substrate.

35. A hybrid information recording medium provided with an IC module and an optical recording layer, each as information storage means, said recording medium comprising:

a first substrate which retains the IC module, said first substrate being out of direct contact with the optical recording layer; and a second substrate which retains the optical recording layer, wherein the optical recording layer is disposed at a surface of said second substrate which faces said first substrate, wherein said first substrate has an IC module fitting part and has a second fitting part for said second substrate, wherein said first substrate has a concavity for fitting the IC module at said IC module fitting part, wherein the concavity has a depth configured to allow the IC module to be embedded, and wherein said first substrate is thicker than the IC module at said IC module fitting part.

36. A hybrid information recording medium according to claim 35, wherein said first substrate has a thickness at said second fitting part which is the same as the thickness of said first substrate at said IC module fitting part when said second substrate is bonded to said first substrate.

37. A hybrid information recording medium provided with an IC module and an optical recording layer, each as information storage means, said recording medium comprising:

a first substrate which retains the IC module; and a second substrate which retains the optical recording layer, wherein the optical recording layer is disposed at a surface of said second substrate which faces said first substrate, and wherein the optical recording layer is disposed so as to be out of direct contact with said first substrate to prevent heat from being transmitted from the IC module to the optical recording layer.

38. A process for producing a hybrid information recording medium comprising an IC module and an optical recording layer, each as information storage means, which comprises the steps of:

providing a first substrate for retaining the IC module;

providing a second substrate carrying the optical recording layer, wherein the optical recording layer is disposed at a surface of the second substrate which faces the first substrate;

bonding the first substrate to the second substrate without exposing the optical recording layer, and without bringing into contact the optical recording layer with the first substrate to prevent heat from being transmitted from the IC module to the optical recording layer; and bonding the IC module to the first substrate.

39. A hybrid information recording medium according to claim 1, wherein said second substrate is transparent.

40. A process according to claim 29, wherein the second substrate is transparent.

41. A hybrid information recording medium according to claim 30, wherein said second substrate is transparent.

42. A hybrid information recording medium according to claim 35, wherein said second substrate is transparent.

43. A hybrid information recording medium according to claim 37, wherein said second substrate is transparent.

44. A process according to claim 38, wherein the second substrate is transparent.

45. A hybrid information recording medium according to claim 30, wherein the optical recording layer is disposed so as to be out of direct contact with said first substrate to avoid influence of heat from the IC module on the optical recording layer.

46. A hybrid information recording medium according to claim 30, wherein the optical recording layer is disposed so as to be out of direct contact with said first substrate to prevent heat from being transmitted from the IC module to the optical recording layer.

* * * * *

UNITED STATES PATENT AND TRADEMARK OFFICE
CERTIFICATE OF CORRECTION

PATENT NO. : 5,744,792
DATED : April 28, 1998
INVENTOR(S) : HIROYUKI IMATAKI, ET. AL.

It is certified that error appears in the above-identified patent and that said Letters Patent is hereby corrected as shown below:

The Title page, showing the illustrative figures, should be deleted and substitute therefor the attached Title page.

<u>IN THE DRAWINGS</u>

Replace Sheets 2, 3, 5 and 7 containing incorrectly printed Figures 2(a), 3(c), 6(a), 6(b), 10 and 11 in the Letters Patent with the attached corrected Sheets 2, 3, 5 and 7, showing corrected Figures 2(a), 3(c), 6(a), 6(b), 10 and 11.

Signed and Sealed this

Thirtieth Day of May, 2000

Attest:

Q. TODD DICKINSON

*Attesting Officer*     *Director of Patents and Trademarks*

United States Patent [19]
Imataki et al.

[11] Patent Number: 5,744,792
[45] Date of Patent: Apr. 28, 1998

[54] HYBRID INFORMATION RECORDING MEDIUM

[75] Inventors: Hiroyuki Imataki, Yokohama; Mizuho Hiraoka, Kawasaki, both of Japan

[73] Assignee: Canon Kabushiki Kaisha, Tokyo, Japan

[21] Appl. No.: 736,965

[22] Filed: Oct. 25, 1996

Related U.S. Application Data

[63] Continuation of Ser. No. 313,583, Sep. 29, 1994, abandoned.

[30] Foreign Application Priority Data

Oct. 5, 1993 [JP] Japan .................................. 5-271138

[51] Int. Cl.⁶ .......................... G06K 19/06; G06K 19/00
[52] U.S. Cl. .................................. 235/492; 235/487
[58] Field of Search .......................... 235/441, 440, 235/492, 487, 486; 363/250

[56] References Cited

U.S. PATENT DOCUMENTS

| | | | |
|---|---|---|---|
| 4,617,216 | 10/1986 | Haghiri-Tehrani et al. | 235/488 |
| 4,672,182 | 6/1987 | Hirokawa | 235/436 |
| 4,719,140 | 1/1988 | Hara et al. | 235/488 X |
| 4,879,153 | 11/1989 | Ohashi et al. | 235/488 X |
| 4,916,300 | 4/1990 | Ishida | 235/488 X |
| 4,990,759 | 2/1991 | Gloton et al. | 235/488 X |
| 5,085,925 | 2/1992 | Hiraoka et al. | 428/215 |
| 5,111,033 | 5/1992 | Fujita | 235/488 |
| 5,208,450 | 5/1993 | Uenishi et al. | 235/488 X |
| 5,248,584 | 9/1993 | Miura et al. | 430/270 |
| 5,272,326 | 12/1993 | Fujita | 235/488 X |
| 5,317,138 | 5/1994 | Togawa | 235/441 X |
| 5,332,890 | 7/1994 | Kitahara | 235/441 X |

FOREIGN PATENT DOCUMENTS

| | | | |
|---|---|---|---|
| 0147337 | 7/1985 | European Pat. Off. | |
| 0212505 | 3/1987 | European Pat. Off. | 235/487 |
| 0431493 | 6/1991 | European Pat. Off. | 235/375 |
| 0528275 | 2/1993 | European Pat. Off. | 235/487 |
| 2575854 | 7/1986 | France | 235/492 |
| 61-103287 | 5/1986 | Japan | 235/487 |
| 62-103197 | 5/1987 | Japan | 235/492 |
| 4-49098 | 2/1992 | Japan | 235/487 |
| 5067250 | 3/1993 | Japan | 235/440 |
| 2100669 | 1/1983 | United Kingdom | 235/487 |

*Primary Examiner*—Donald T. Hajec
*Assistant Examiner*—Thien Minh Le
*Attorney, Agent, or Firm*—Fitzpatrick, Cella, Harper & Scinto

[57] ABSTRACT

A hybrid information recording medium provided with an IC module and an optical recording layer as information storage means, which can avoid the influence of heat generated at the IC module on the optical recording layer. The hybrid information recording medium comprises a first substrate which retains the IC module. The first substrate does not contact the optical recording layer.

46 Claims, 8 Drawing Sheets

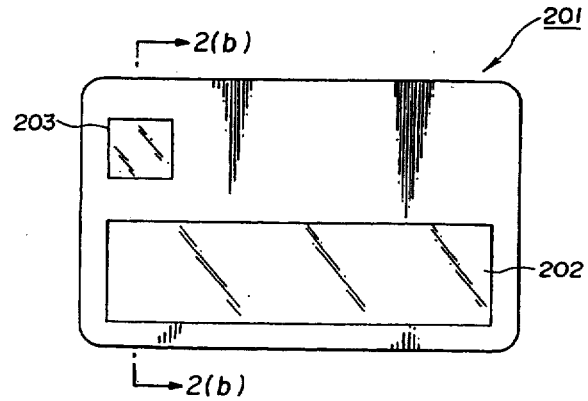

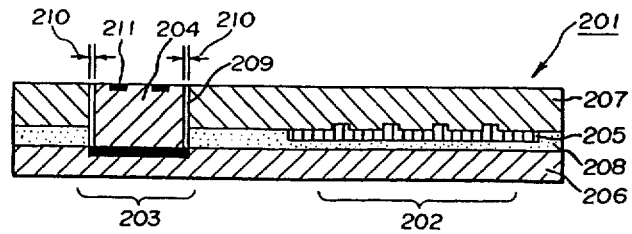

UNITED STATES PATENT AND TRADEMARK OFFICE
CERTIFICATE OF CORRECTION

PATENT NO. : 5,744,792

DATED : April 28, 1998

INVENTOR(S) : HIROYUKI IMATAKI, ET AL.

It is certified that error appears in the above-identified patent and that said Letters Patent is hereby corrected as shown below:

Title page,
Item [56] <u>FOREIGN PATENT DOCUMENTS</u>:

"5067250" should read --5-067250--.

<u>COLUMN 1</u>:

Line 20, "example" should read --example;--.

<u>COLUMN 3</u>:

Line 19, "(b)," should read --2(b),--.

<u>COLUMN 4</u>:

Line 42, "However" should read --However,--.
Line 62, "a" should read --the--.

<u>COLUMN 5</u>:

Line 61, "however" should read --however,--.

<u>COLUMN 6</u>:

Line 20, "producr" should read --product--.
Lines 20-21, "producted" should read --produced--.
Line 22, "producted" should read --produced--.